United States Patent
Akella et al.

(10) Patent No.: US 8,996,857 B1
(45) Date of Patent: Mar. 31, 2015

(54) SINGLE SIGN-ON METHOD IN MULTI-APPLICATION FRAMEWORK

(75) Inventors: Sujan Akella, New York, NY (US); Yevgeny Kolyakov, Brooklyn, NY (US); Vijay Nara, Washington Township, NJ (US); Michael Russin, East Rockaway, NY (US)

(73) Assignee: Thomson Financial LLC, New York, NY (US)

( * ) Notice: Subject to any disclaimer, the term of this patent is extended or adjusted under 35 U.S.C. 154(b) by 675 days.

(21) Appl. No.: 11/758,087

(22) Filed: Jun. 5, 2007

Related U.S. Application Data

(60) Provisional application No. 60/811,518, filed on Jun. 5, 2006.

(51) Int. Cl.
*H04L 29/06* (2006.01)
*G06F 21/41* (2013.01)

(52) U.S. Cl.
CPC ............ *H04L 63/0815* (2013.01); *G06F 21/41* (2013.01)
USPC ............ 713/153; 726/4; 726/5; 726/6; 726/7; 726/8

(58) Field of Classification Search
USPC .......................................................... 726/8
See application file for complete search history.

(56) References Cited

U.S. PATENT DOCUMENTS

| | | | |
|---|---|---|---|
| 5,774,551 A * | 6/1998 | Wu et al. ................. | 713/155 |
| 7,424,734 B2 * | 9/2008 | Katsube ................... | 726/4 |
| 7,428,749 B2 * | 9/2008 | McGarvey et al. ....... | 726/8 |
| 2001/0034792 A1 * | 10/2001 | Swildens .................. | 709/238 |
| 2002/0111942 A1 * | 8/2002 | Campbell et al. ........ | 707/3 |
| 2003/0028773 A1 * | 2/2003 | McGarvey et al. ....... | 713/176 |
| 2003/0065940 A1 * | 4/2003 | Brezak et al. ............ | 713/201 |
| 2003/0131110 A1 * | 7/2003 | Chang et al. ............. | 709/227 |
| 2003/0177388 A1 * | 9/2003 | Botz et al. ................ | 713/201 |
| 2004/0123140 A1 * | 6/2004 | Toomey ................... | 713/201 |
| 2004/0230831 A1 | 11/2004 | Spelman et al. | |
| 2004/0250118 A1 * | 12/2004 | Andreev et al. .......... | 713/201 |
| 2005/0021975 A1 * | 1/2005 | Liu .......................... | 713/182 |
| 2005/0267869 A1 * | 12/2005 | Horvitz et al. ........... | 707/2 |
| 2006/0031683 A1 * | 2/2006 | Marion et al. ............ | 713/185 |
| 2006/0036969 A1 * | 2/2006 | Guido et al. ............. | 715/804 |
| 2007/0240206 A1 * | 10/2007 | Wu et al. .................. | 726/8 |
| 2007/0245414 A1 * | 10/2007 | Chan et al. ............... | 726/12 |
| 2008/0034199 A1 * | 2/2008 | Nair et al. ................ | 713/153 |

* cited by examiner

*Primary Examiner* — Matthew Henning
(74) *Attorney, Agent, or Firm* — Kelley Drye & Warren

(57) ABSTRACT

A method and system for allowing a single-sign on to access independently purveyed applications with a highly secure single-sign methodology which permits wide area public access, such as through the Internet, to private access weaker credentialed sign-on applications without a need to upgrade the credential requirements for access to the applications.

6 Claims, 2 Drawing Sheets

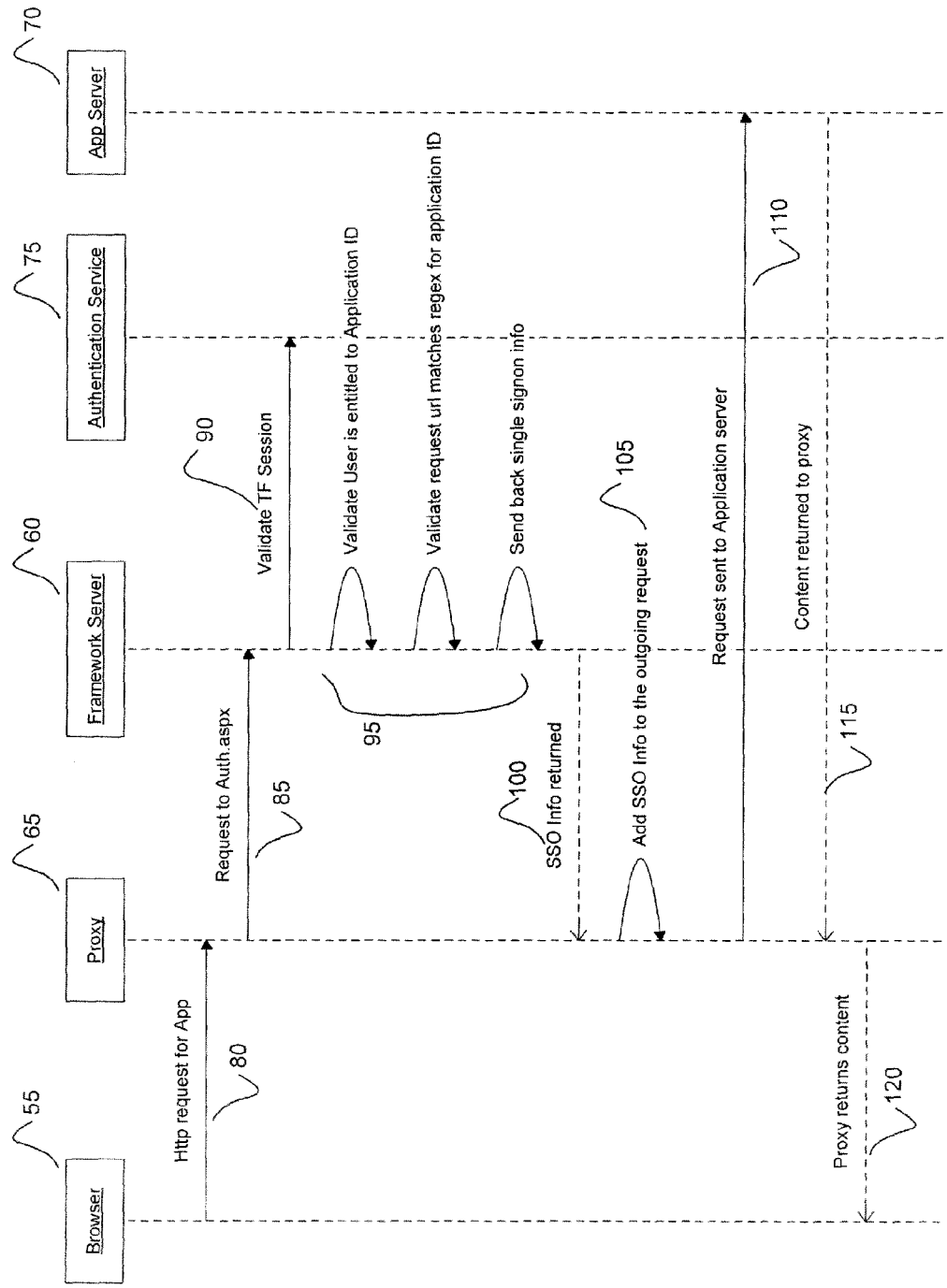

SINGLE SIGN-ON METHOD IN MULTI-APPLICATION FRAMEWORK

CROSS-REFERENCE TO RELATED APPLICATIONS

This application claims benefit of U.S. Provisional patent application S/N 60/811,518, filed Jun. 5, 2006, the contents of which is incorporated by reference herein in its entirety.

BACKGROUND OF THE INVENTION

1. Field of the Invention

The present invention generally relates to providing a single sign-on capability for accessing applications in a common framework.

2. Description of the Related Art

In computing, a framework is a defined support structure in which another software project can be organized and/or developed. In computer programming, an application framework is a term usually used to refer to a set of libraries or classes that are used to implement the standard structure of an application for a specific operating system.

Separately designed applications typically require the provision of different specified credentials in order to sign-in to use the application. Multiple sign-in credentials not only slow the process of trying to use data generated in one application in another application in the framework, but also provide considerable frustration to the user who is left to store and retrieve credential information for each application upon initialization of the application. Authentication for each application may entail a custom authentication protocol, often based on posting a user's name and password.

Web applications more and more require that a user be authenticated before receiving access. As it is not atypical for a user to employ Web applications through many different sites, a great deal of time may be spent by an individual in authenticating. The need for multiple authentication in particular occurs when the web application is not provided by the individual organization. That is, when faced with web applications from multiple, independent organizations, and individual may encounter the need for multiple individual logins, a limitation that detracts for the desired convenience and seamless access which may be expected of the Web application.

U.S. Patent Publication No. 20040230831 attempts to overcome the problem of the need to provide multiple sign-ons when faced with web applications from multiple, independent organizations, in setting up a federation that refers to different organizations or realms that have agreed to standards to make user identity and entitlements portable between organizations. The communications are redirected through a client in one realm to obtain a security token that can allow the resource server in the other realm to authenticate the user for access to the Web application. In an application, a resource challenge is generated responsive to a request for access to a Web application provided by the resource server. The resource realm and the account realm share a trust policy in a federation. A security token service challenge is sent to an account security token service module of the account realm through the Web-based client, responsive to receiving the resource challenge. An account security token received from the account security token service module through the Web-based client is verified, responsive to the sending of the security token service challenge. The account security token is formatted in accordance with the trust policy in the federation. A resource security token generated by the resource security token service module through the Web-based client is sent to the resource server to authenticate the user for access to the Web application, responsive to verify the account security token.

While the system described in U.S. Patent Publication 20040230831 would allow for a passive client single sign-on for Web applications, it requires a degree of cooperation between disparate purveyors of applications which may not be easily obtained.

The credentials necessary to sign-on to different application services can vary widely. Many systems were originally designed for limited access to defined numbers of clients. Private system connection applications may have been designed to require significantly weaker credentials for access, than systems that are available over public systems, such as the Internet. To upgrade the sign-on credentials of all of these applications would require significant time and effort to modify each and every application.

A single sign-on would be particularly advantageous in terms of financial data. To many professionals involved with financial transactions, time is money, as is quick reliable up-to-the-minute information. Decisions based on stale financial information can cause money to be lost which would otherwise not be lost. The time financial professionals expend in entering numerous financial websites results leads to an inaccurate picture of the overall financial state existing at one point in time (that is, the professional's snapshot includes both up-to-date and stale data).

There is therefore a need for a better method and system for allowing a single-sign on to access independently purveyed applications. In particular, there is a need for a highly secure single-sign methodology which permits wide area public access, such as through the Internet, to private access weaker credentialed sign-on applications without a need to upgrade the credential requirements for access to each of such applications.

SUMMARY OF THE INVENTION

There is disclosed a server in a client-server system, said server operatively configured to provide sign-on credentials for two or more non-public isolated secured-access applications upon receipt over a public network of credentials for sign-on to the system, and subsequent authorization of the system sign-on credentials.

Further embodiments comprise:

A method comprising: (a) receiving credentials required for a client-server system sign-on; (b) authenticating the credentials for the client-server system sign-on; (c) causing sign-on to two or more independent applications requiring independent sign-on credentials which are not as secure as the system sign-on credentials upon authentication of the client-server system sign-on credentials.

The embodiment may further include wherein step (c) is effectuated by way of a pointer associating the sign-on credentials for the client server system with the sign-on credentials for the two or more independent applications, or wherein the two or more independent applications are accessible through a publicly-accessible network. The publicly-accessible network may be the internet and the client-server may be in a publicly-accessible network.

In a client-server architecture having a proxy server, a method for a single sign-on for a plurality of non-interfaced independent web-based applications in a single framework the method comprising: (a) storing on the proxy server a pointer associating the sign-on credentials for a first of the web-based applications with the sign-on credentials for one or more of the other web-based applications in the single framework; (b) activating through the proxy server sign-on to the one or more other web-based applications when the first web-based application is signed on.

In a client-server architecture system having a reverse proxy server, a method for a single sign-on to two or more non-interfaced independent applications in a single framework, the method comprising: (a) storing on the reverse proxy server a pointer associating a credentialed sign-on onto the system with the credentials necessary for access to the two or more isolated independent applications; (b) activating through the reverse proxy server sign-on to the two or more isolated independent applications when the system sign-on is authenticated. In such an embodiment, the credentials required for sign-on to the system may be more secure than those of the two or more non-interfaced independent applications.

This embodiment may further include wherein the sign-on credentials for the first of the web-based applications are different from the sign-on credentials for the one or more of the other web-based applications and wherein the sign-on credentials for the first of the web-based applications is significantly more detailed than the sign-on credentials for the one or more of the other web-based applications. The sign-on credentials for the first of the web-based applications may require more authenticating data than the sign-on credentials for the one or more of the other web-based applications. The embodiment may further comprise before step (b), the step of: authenticating the sign-on credentials of the first web-based application and thereby allowing sign-on to said first web-based application. Alternatively, as shown above, the proxy server may be a reverse proxy server and the proxy server might check with a framework server to determine whether the credentials supplied are authentic.

A system to allow a user to view in tandem financial information from disparate financial sources using one source log-in credential, said system comprising: a server operatively configured to correlate the source log-in credential with appropriate disparate log-in-credentials necessary to log into the disparate financial sources, to log-in to said disparate financial sources using the appropriate disparate login credentials to obtain information from said disparate financial sources; and a display device operatively connected to said server, the display device being operatively configured to relay information from the two or more disparate financial sources on an individual screen, tiled screen, or other format allowing for in tandem viewing. Alternatively, the server may be a reverse proxy server.

BRIEF DESCRIPTION OF THE DRAWINGS

FIG. 2, is an exemplary sequence diagram of a system embodiment.

DETAILED DESCRIPTION OF THE INVENTION

Figure 1:
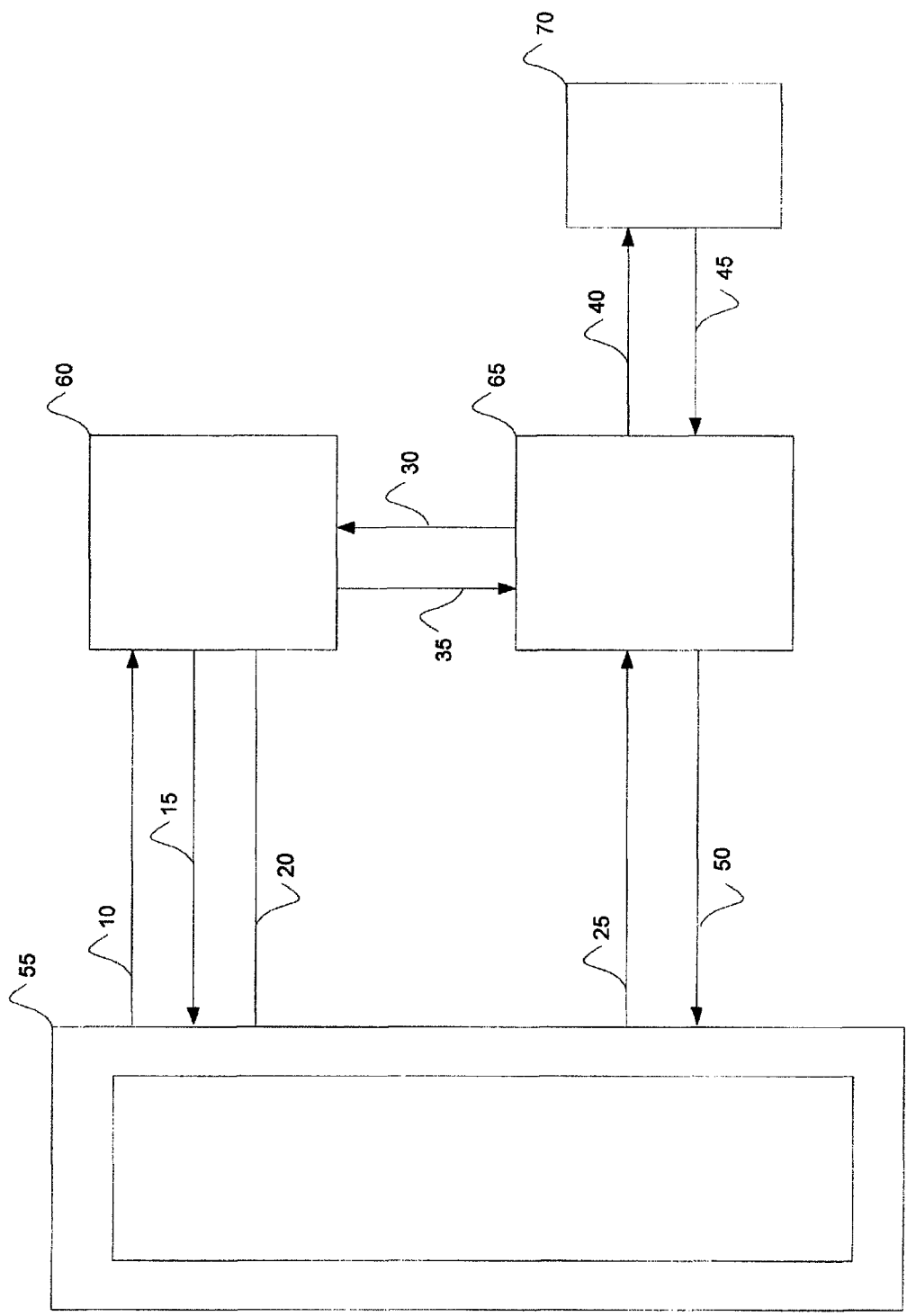
FIG. 1, is an ememplary workflow chart of a system embodiment.

The present invention provides in one embodiment in a thin framework a method and system for allowing multiple sign-on to applications from a single authenticated sign-on to a system.

In one embodiment, there is disclosed a method and system for permitting public access to relatively weak-credentialed application services that were previously only available over secured non-public lines. In such an embodiment a server, such as a proxy server/cap server requires input pertaining to the authentication of encrypted credentials for sign-on to the system, and upon confirmation of authentication of the system sign-on provides the credentials necessary for access to the weaker-credentialed application services.

In another embodiment, there is disclosed a method and system to allow a user to view in tandem financial information from disparate sources using one log-in credential. In such embodiment, a server includes pointers that correlate the log-in credential with the appropriate log-credentials necessary to log into the disparate sources, and relays the desired information from two or more sources to the user to display the information on a individual screen, tiled screens, or other format allowing for in tandem viewing.

Now turning to FIG. 1, there is shown workflow chart of a system capable of single-sign on to an application server hosting two or more application services. At step 10 an initial request is sent from the browser 55 to the load balancer (not shown) using https and the load balancer decrypts the request and forwards it to framework server 60 along with digital credentials for sign-on to the system. At step 15 an encrypted response is sent by the framework server 60 and received back by browser 55. The response from framework server 60 sets up a number of application Iframes and sets up at step 20 a connection between framework server 60 and browser 55. At step 25 a URL within the Iframe sends a request through a load balancer (not shown) to proxy server 65. Proxy server 65 at step 30 checks with framework server 60 to determine whether the credentials supplied at step 10 are authenticate from input at step 35 from framework server 60. Proxy server 65 upon confirming authentication of system sign-on determines the applications that are requested and confirms (step 40) such applications reside on Application Servers 70. Proxy server 65 then checks pointers to credentials needed for sign-on to requested applications on Application Servers 70 and provides the required credentials for application sign-on to the appropriate application servers 70. At step 45, the appropriate application servers 70 respond back to proxy server 65 and the requested connectivity is made with browser 55 at step 50.

Now turning to FIG. 2, there is shown a sequence diagram of a system embodiment permitting single-sign on to multiple applications on one or more application servers. Browser 55 sends a request for an application at step 80 to proxy 65. Proxy 65 requests authorization (step 85) from framework server 60 of credentials sent by browser 55. Framework 60 validates the session (step 90) and browser 55 credentials by a number of methods such as set forth at step 95, validating user entitled to application id, validate request URL matches the regular expression of an application id, and send back the single sign-on information. At step 100 the framework server 60 after authenticating system sign-on credentials provides the credentials necessary for proxy 65 to send to application server 70 the credentials by addition of same to an outgoing request (step 105) necessary sign-on to the appropriate applications residing on application server(s) 70. At step 110 the request with appropriate credentials is sent to application server 70. Application server 70 then supplies content (step 115) to proxy server 65, which in turn returns content at step 120 to browser 55.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

We claim:

1. A method for single sign-on to servers in a client-server network comprising:
   receiving at a framework server a request from a browser via a load balancer, said load balancer decrypting said request and including digital sign-on credentials;
   sending an encrypted response from said framework server configured to generate a number of application Iframes and a connection between said framework server and said browser;
   receiving at a proxy server, a request from a URL within one or more of said Iframes via said load balancer;
   causing said proxy server in conjunction with said framework server to authenticate said credentials;
   determining, by said proxy server, the applications requested and confirming that said applications reside on applications servers;
   providing, by said proxy server, credentials required for sign-on to appropriate application servers;
   causing an indirect communicative connection between said browser and said appropriate application servers through said proxy server; and
   causing content from said appropriate applications servers to be supplied to said proxy server, wherein said content is further supplied to said browser.

2. The method of claim 1 wherein said providing, by said proxy server, credentials required for sign-on to appropriate application servers is effectuated by way of a pointer associating said digital sign-on credentials for the client-server system with said credentials required for sign-on to said appropriate application servers.

3. The method of claim 1 wherein said applications requested are accessible through a private-access network.

4. The method of claim 1 wherein said applications requested are accessible through a publicly-accessible network.

5. The method of claim 4 wherein the publicly-accessible network is the Internet.

6. The method of claim 1 wherein the client-server network is a publicly-accessible network.

* * * * *